(12) United States Patent
Kim et al.

(10) Patent No.: US 12,684,057 B2
(45) Date of Patent: Jul. 14, 2026

(54) BACK PLATE FILM

(71) Applicant: LG Chem, Ltd., Seoul (KR)

(72) Inventors: Jin Hoo Kim, Daejeon (KR); Dong Hwan Ryu, Daejeon (KR); Jong Pil Roh, Daejeon (KR)

(73) Assignee: XINMEI FONTANA HOLDING (HONG KONG) LIMITED, Hong Kong (CN)

( * ) Notice: Subject to any disclaimer, the term of this patent is extended or adjusted under 35 U.S.C. 154(b) by 239 days.

(21) Appl. No.: 18/698,140

(22) PCT Filed: Nov. 25, 2022

(86) PCT No.: PCT/KR2022/018860
§ 371 (c)(1),
(2) Date: Apr. 3, 2024

(87) PCT Pub. No.: WO2023/096407
PCT Pub. Date: Jun. 1, 2023

(65) Prior Publication Data
US 2024/0406299 A1 Dec. 5, 2024

(30) Foreign Application Priority Data
Nov. 25, 2021 (KR) ........................ 10-2021-0164149

(51) Int. Cl.
*H04M 1/02* (2006.01)
*B32B 7/06* (2019.01)
(Continued)

(52) U.S. Cl.
CPC ............. *H04M 1/0266* (2013.01); *B32B 7/06* (2013.01); *B32B 7/12* (2013.01); *B32B 27/08* (2013.01);
(Continued)

(58) Field of Classification Search
CPC ... H04M 1/0266; H04M 2250/52; B32B 7/06; B32B 7/12; B32B 27/08; B32B 27/36;
(Continued)

(56) References Cited

U.S. PATENT DOCUMENTS 7,982,826 B2 * 7/2011 Hirakata ........... G02F 1/133528
349/114
2009/0279030 A1 11/2009 Toyama et al.
(Continued)

FOREIGN PATENT DOCUMENTS

CN 101258028 A 9/2008
CN 109643035 A 4/2019
(Continued)

OTHER PUBLICATIONS

International Search Report for Application No. PCT/KR2022/018860 mailed Mar. 8, 2023. 2 pgs.
(Continued)

*Primary Examiner* — Matthew D. Anderson
(74) *Attorney, Agent, or Firm* — Ricky Lam

(57) ABSTRACT
The present application relates to a back plate film. The present application provides a back plate film for an under-display camera in which a front camera of a mobile phone can capture a subject without image distortion. The back plate film of the present application can be usefully used in, for example, an OLED panel.

17 Claims, 3 Drawing Sheets

10

| retardation base material layer | ~10a |
| first pressure-sensitive adhesive layer | ~10b |

| first base material film | ~20a | 20 |
| second pressure-sensitive adhesive layer | ~20b | |
| retardation base material layer | ~10a | 10 |
| first pressure-sensitive adhesive layer | ~10b | |
| silicone layer | ~30a | 30 |
| second base material film | ~30b | |

(51) Int. Cl.

| | |
|---|---|
| *B32B 7/12* | (2006.01) |
| *B32B 27/08* | (2006.01) |
| *B32B 27/36* | (2006.01) |
| *C09J 7/29* | (2018.01) |
| *C09J 7/38* | (2018.01) |
| *C09J 7/40* | (2018.01) |

(52) U.S. Cl.
CPC ................. *B32B 27/36* (2013.01); *C09J 7/29* (2018.01); *C09J 7/385* (2018.01); *C09J 7/401* (2018.01); *B32B 2250/02* (2013.01); *B32B 2250/244* (2013.01); *B32B 2255/10* (2013.01); *B32B 2255/26* (2013.01); *B32B 2255/28* (2013.01); *B32B 2307/42* (2013.01); *B32B 2307/748* (2013.01); *B32B 2457/206* (2013.01); *C09J 2203/326* (2013.01); *C09J 2301/162* (2020.08); *C09J 2301/302* (2020.08); *H04M 2250/52* (2013.01)

(58) Field of Classification Search
CPC ......... B32B 2250/02; B32B 2250/244; B32B 2255/10; B32B 2255/26; B32B 2255/28; B32B 2307/42; B32B 2307/748; B32B 2457/206; B32B 7/023; B32B 2457/208; C09J 7/29; C09J 7/385; C09J 7/401; C09J 2203/326; C09J 2301/162; C09J 2301/302; C09J 2301/312; C09J 2467/006; C09J 7/255; C09J 2203/318; C09J 2433/00; C09J 2301/314; C08J 5/18; C08J 7/044
See application file for complete search history.

(56) References Cited

U.S. PATENT DOCUMENTS

| | | | |
|---|---|---|---|
| 2011/0304801 A1* | 12/2011 | Shibata | ............. G02F 1/133528 |
| | | | 349/96 |
| 2015/0362647 A1 | 12/2015 | Tanimoto et al. | |
| 2016/0195767 A1 | 7/2016 | Lee et al. | |
| 2018/0246603 A1 | 8/2018 | Yu et al. | |
| 2019/0204677 A1 | 7/2019 | Kim et al. | |
| 2020/0071577 A1 | 3/2020 | Lee et al. | |
| 2021/0167163 A1 | 6/2021 | Jeong et al. | |

FOREIGN PATENT DOCUMENTS

| | | | |
|---|---|---|---|
| CN | 111433305 A | | 7/2020 |
| CN | 111819478 A | | 10/2020 |
| JP | 2003-147288 A | | 5/2003 |
| JP | 2015-184460 A | | 10/2015 |
| JP | 2020023145 A | | 2/2020 |
| JP | 2021-063984 A | | 4/2021 |
| KR | 100587441 B1 | | 9/2006 |
| KR | 2008-0027907 A | | 3/2008 |
| KR | 20100007134 A | | 1/2010 |
| KR | 20150108320 A | | 9/2015 |
| KR | 20160012441 A | | 2/2016 |
| KR | 20160130360 A | | 11/2016 |
| KR | 20170051188 A | | 5/2017 |
| KR | 101789896 B1 | | 10/2017 |
| KR | 20180068253 A | | 6/2018 |
| KR | 20200006225 A | | 1/2020 |
| KR | 2020-0014222 A | | 2/2020 |
| KR | 2020-0059880 A | | 5/2020 |
| KR | 2020-0098741 A | | 8/2020 |
| KR | 20210038422 A | | 4/2021 |
| KR | 2021-0091136 A | | 7/2021 |
| KR | 102305521 B1 | | 9/2021 |
| TW | 202016582 A | | 5/2020 |
| TW | 202030088 A | | 8/2020 |

OTHER PUBLICATIONS

International Search Report for Application No. PCT/KR2022/018864 mailed Mar. 10, 2023. 2 pgs.

* cited by examiner

[Figure 1]
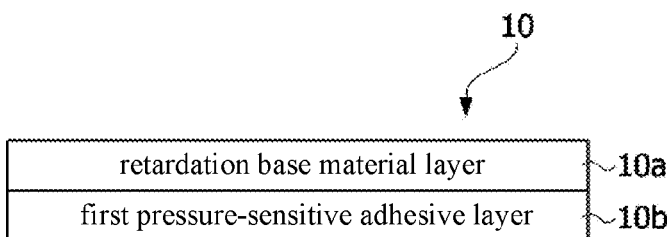
[Figure 2]
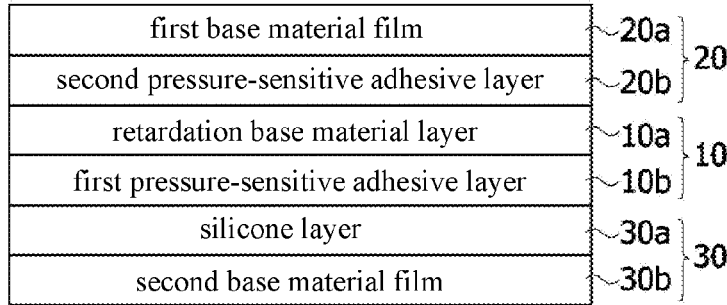
[Figure 3]
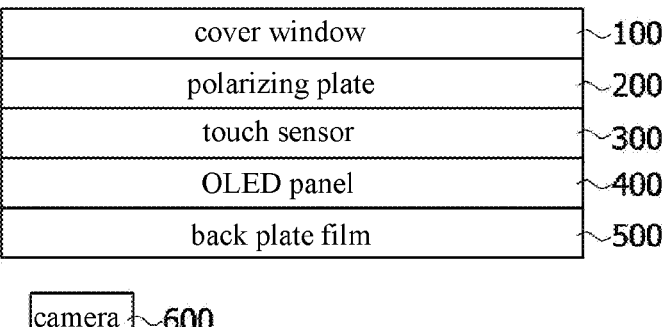

[Figure 4]
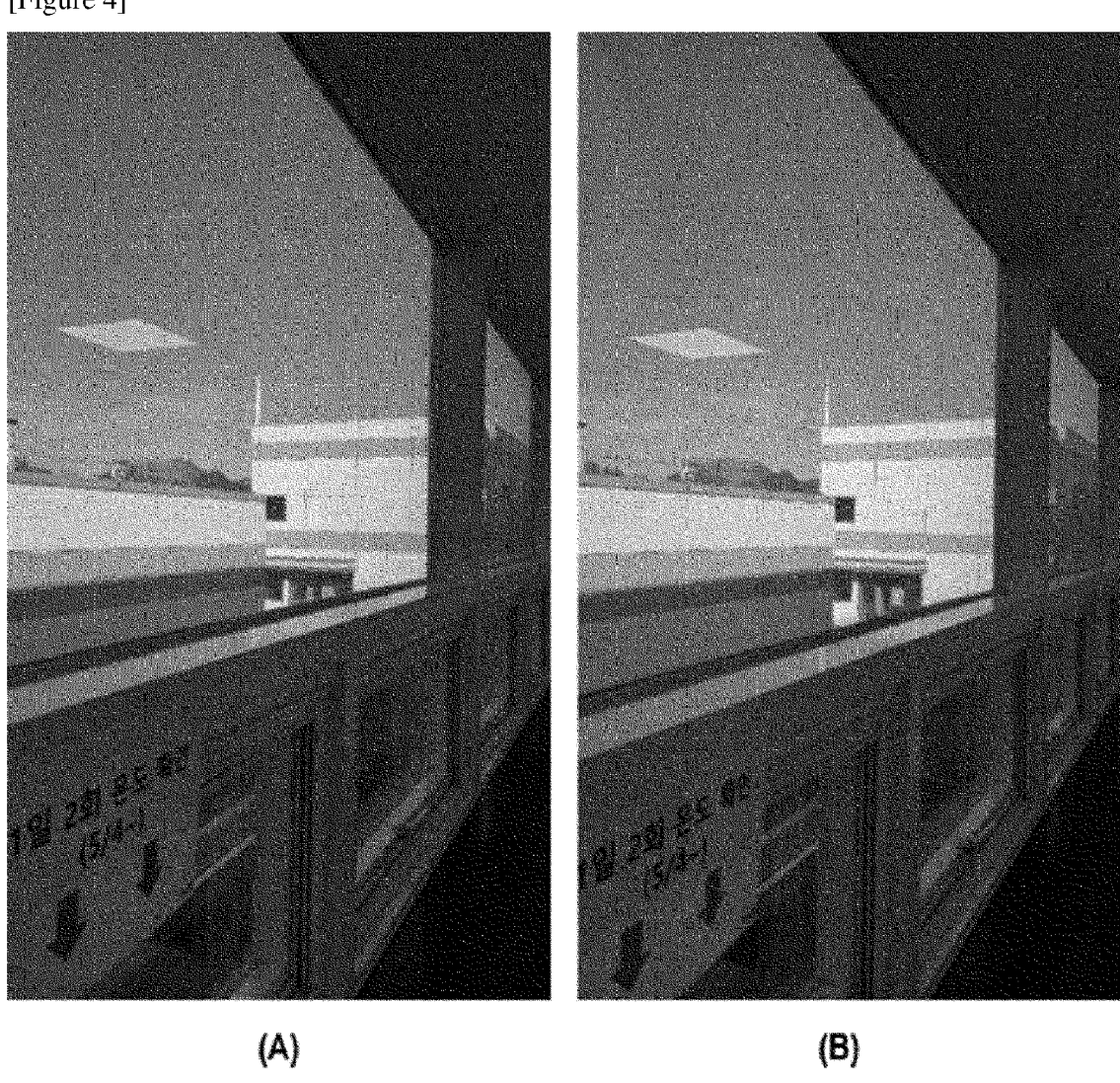
(A)    (B)

[Figure 5]
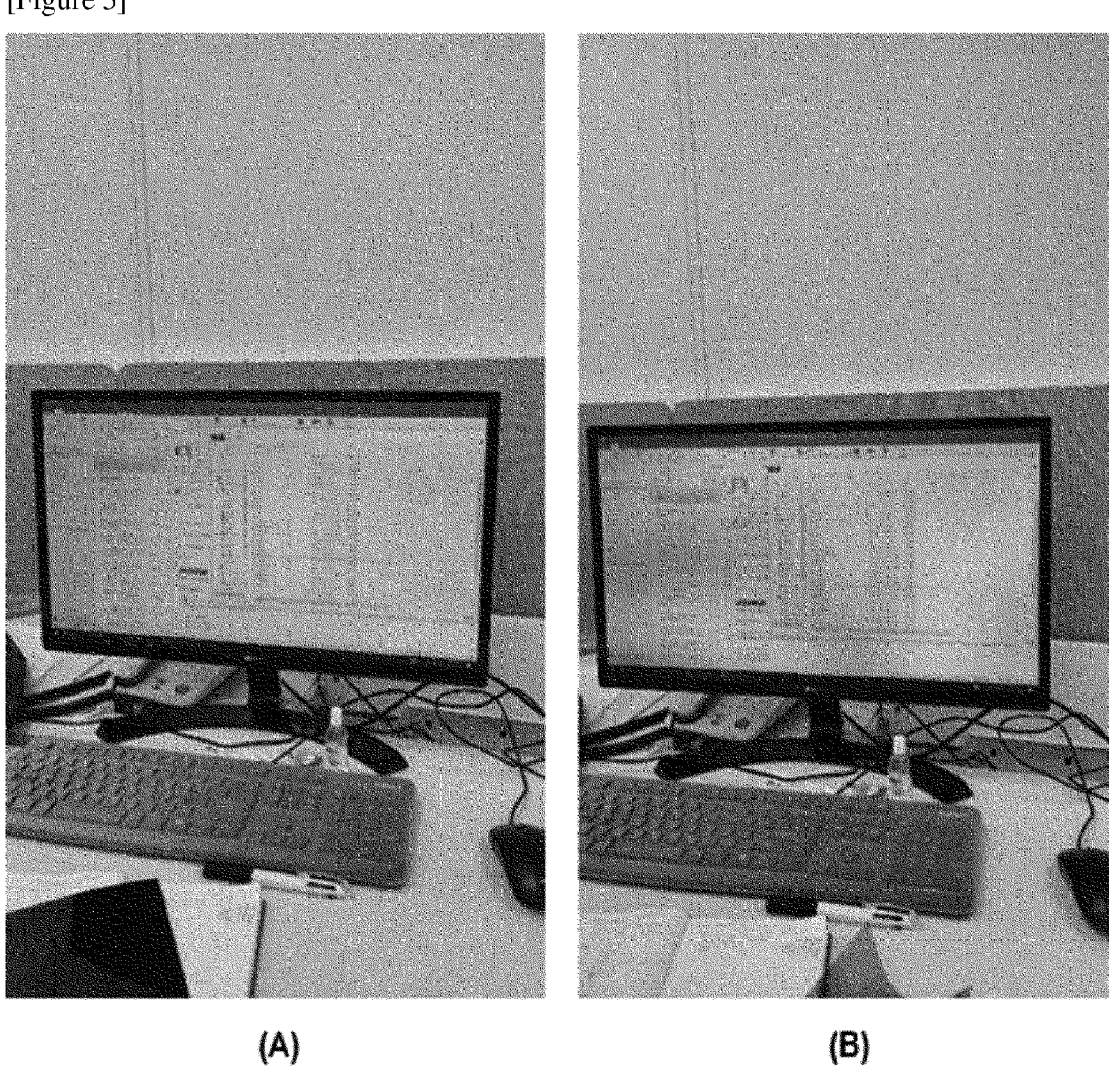
(A)                              (B)

BACK PLATE FILM

CROSS-REFERENCE TO RELATED APPLICATIONS

This application is a national phase entry under 35 U.S.C. § 371 of International Application No. PCT/KR2022/018860, filed on Nov. 25, 2022, which claims the benefit of Korean Patent Application No. 10-2021-0164149, filed on Nov. 25, 2021, all of which are incorporated herein by reference.

TECHNICAL FIELD

The present application relates to a back plate film.

BACKGROUND ART

In the case of a front camera of a mobile phone, it is manufactured by a method of punching a front camera region in an OLED (organic light emitting diode) panel to assemble a camera module.

In order to implement a display on the front camera, it should be designed in a structure in which the internal camera (under-display camera) passes through the OLED panel or polarizer to take pictures of subjects without punching the front camera region on the OLED panel.

The existing back plate film applied to the OLED panel uses a PET (polyethylene terephthalate) film or a PI (polyimide) film as a base material film. However, in the case of the existing PET film, the subject is distorted due to the high phase difference, and in the case of the PI film, the color is yellowish, so that there is a limit to color correction.

PRIOR ART DOCUMENTS

Patent Documents

Korean Laid-Open Patent Publication No. 10-2020-0098741

DISCLOSURE

Technical Problem

The present application provides a back plate film for an under-display camera in which a front camera of a mobile phone can capture a subject without image distortion.

Technical Solution

The present application relates to a back plate film. FIG. 1 exemplarily shows a back plate film of the present application. The back plate film may comprise a retardation base material layer (10a), and a first pressure-sensitive adhesive layer (10b) formed on one side of the retardation base material layer (10a).

In this specification, the back plate film comprising the retardation base material layer (10a) and the first pressure-sensitive adhesive layer (10b) without including a protective film (20) and a release film (30), which are described below, may be referred to as a first back plate film, and the back plate film comprising the protective film (20) and the release film (30), which are described below, and the retardation base material layer (10a) and the first pressure-sensitive adhesive layer (10b) may be referred to as a second back plate film.

The retardation base material layer may have an absolute value of an in-plane retardation (R0) value of 6,000 nm or more. The retardation base material layer may have an absolute value of a thickness direction retardation (Rth) value of 6,000 nm or more. In this specification, the in-plane retardation (R0) value may be calculated by Equation 1 below. Also, in this specification, the thickness direction retardation (Rth) value may be calculated by Equation 2 below. When the retardation values of the retardation base material layer is within the above range, it is possible to provide a back plate film for an under-display camera capable of photographing a subject without image distortion by a front camera of a mobile phone.

The upper limit of the absolute value of the in-plane retardation (R0) value of the retardation base material layer may be, for example, 10,000 nm or less. The upper limit of the absolute value of the thickness direction retardation (Rth) value of the retardation base material layer may be, for example, 10,000 nm or less.

The absolute value of the in-plane retardation (R0) value of the retardation base material layer may be, for example, 6,000 nm or more, 6,500 nm or more, 7,000 nm or more, 7,100 nm or more, 7,200 nm or more, 7,300 nm or more, or 7,400 nm or more, and may be 10,000 nm or less, 9,500 nm or less, 9,000 nm or less, 8,500 nm or less, 8,000 nm or less, or 7,500 nm or less. In one example, the in-plane retardation (R0) value of the retardation base material layer may be a positive number.

The absolute value of the thickness direction retardation (Rth) value of the retardation base material layer may be, for example, 6,000 nm or more, 6,500 nm or more, 7,000 nm or more, 7,500 nm or more, 8,000 nm or more, or 8,100 nm or more, and may be 10,000 nm or less, 9,500 nm or less, 9,000 nm or less, 8,500 nm or less, or 8,300 nm or less. In one example, the thickness direction retardation (Rth) value of the retardation base material layer may be a negative number.

$$R0 = (nx - ny) \times d \qquad \text{[Equation 1]}$$

$$Rth = \left[(nx + ny)/2 - nz\right] \times d \qquad \text{[Equation 2]}$$

In Equations 1 and 2, nx, ny, and nz are the refractive indices of the retardation base material layer in the x-axis direction, y-axis direction, and z-axis direction for light with a wavelength of 550 nm, respectively, and d is the thickness (nm) of the retardation base material layer. The x axis means an axis parallel to the slow axis direction of the retardation base material layer, the y axis means an axis parallel to the fast axis direction of the retardation base material layer, and the z axis means an axis parallel to the thickness direction of the retardation base material layer.

Among the physical properties mentioned in this specification, if the measurement temperature affects the result, the relevant physical property is a physical property measured at room temperature, unless otherwise specified. The term room temperature is a natural temperature without warming or cooling, which is usually a temperature in a range of about 10° C. to 30° C., or about 23° C. or about 25° C. or so. Also, in this specification, the unit of temperature is ° C., unless otherwise specified. Among the physical properties mentioned in this specification, when the measurement pressure affects the result, the relevant physical property is a physical property measured at normal pressure, unless otherwise specified. The term normal pressure is a natural pressure without pressurization or depressurization, which usually refers to about 1 atm or so as the normal pressure.

The thickness of the retardation base material layer may be appropriately selected within a range that does not impair the purpose of the present application. For example, the thickness of the retardation base material layer may be within the range of 20 μm to 200 μm. The thickness of the retardation base material layer may be, specifically, 20 μm or more, 40 μm or more, 60 μm or more, or 80 μm or more, and may be 200 μm or less, 180 μm or less, 160 μm or less, 140 μm or less, 120 μm or less, or 100 μm or less. If the thickness of the retardation base material layer is too thin, workability problems such as breakage and doubling may occur, and if the thickness of the retardation base material layer is too thick, it is difficult to apply to the OLED curvature designs in customer companies' processes, whereby there is a problem that durability deteriorates due to repulsive force, so that it may be advantageous that the thickness of the retardation base material layer is within the above range.

The retardation base material layer may have antistatic performance. In one example, the back plate film may comprise an antistatic layer formed on one side of the retardation base material layer. In this case, the antistatic layer may be formed on the opposite side of the retardation base material layer on which the first pressure-sensitive adhesive layer is located. The sheet resistance of the antistatic layer may be in a range of, for example, $10^4$ Ω/square to $10^{11}$ Ω/square. The sheet resistance of the antistatic layer may be, specifically, $10^4$ Ω/square or more, $10^5$ Ω/square or more, $10^6$ Ω/square or more, $10^7$ Ω/square or more, or $10^9$ Ω/square or more, and may be $10^{11}$ Ω/square or less, or $10^{10}$ Ω/square or less.

A corona treatment may be performed on the surface of the retardation base material layer to which the first pressure-sensitive adhesive layer is attached. Through this, when the first pressure-sensitive adhesive layer is, for example, an acrylic pressure-sensitive adhesive, it is possible to increase attachment force between the retardation base material layer and the acrylic pressure-sensitive adhesive layer. In one example, the corona treatment may be performed on the retardation base material layer under a condition of 5A (ampere) to 25A (ampere) based on a line speed of 20 m/min.

The first pressure-sensitive adhesive layer may be formed on one side of the retardation base material layer. In this specification, the pressure-sensitive adhesive layer may be, for example, a layer of a pressure-sensitive adhesive composition. In this specification, the term "layer of the pressure-sensitive adhesive composition" may mean a layer formed by coating or curing the pressure-sensitive adhesive composition. The term "curing of the pressure-sensitive adhesive composition" may mean implementing a cross-linked structure in the pressure-sensitive adhesive composition through a physical or chemical action or reaction of components included in the pressure-sensitive adhesive composition. The curing can be induced by performing, for example, maintenance at room temperature, moisture application, heat application, active energy ray irradiation, or two or more processes of the foregoing together, and in each case, the pressure-sensitive adhesive composition in a type that the curing is induced may be referred to as, for example, a room temperature curing pressure-sensitive adhesive composition, a moisture-curing pressure-sensitive adhesive composition, a heat-curing pressure-sensitive adhesive composition, an active energy ray-curing pressure-sensitive adhesive composition or a hybrid curing pressure-sensitive adhesive composition.

The first pressure-sensitive adhesive layer may comprise a pressure-sensitive adhesive resin and a curing agent. In one example, the pressure-sensitive adhesive resin may be an acrylic resin. In this specification, the acrylic resin may mean a resin in which among monomers constituting the resin, the acrylic monomer is 70 wt % or more, 75 wt % or more, 80 wt % or more, or 85 wt % or more.

The acrylic resin may be an acrylic polymer comprising a polymerization unit derived from a (meth)acrylic acid ester monomer. In this specification, the term "monomer" may mean all kinds of compounds capable of forming polymers through a polymerization reaction, and the polymer comprising a polymerization unit derived from a certain monomer may mean a polymer formed by polymerization of the certain monomer.

As the (meth)acrylic acid ester compound, for example, alkyl (meth)acrylate may be used. As the alkyl (meth) acrylate, for example, alkyl (meth)acrylate having an alkyl group with 1 to 20 carbon atoms, 1 to 14 carbon atoms, 1 to 12 carbon atoms, 1 to 8 carbon atoms, or 1 to 4 carbon atoms may be used, in consideration of control of the cohesive force, glass transition temperature and adherence properties, and the like. Here, the alkyl group may be, for example, linear, branched, or cyclic. An example of such a monomer may include methyl (meth)acrylate, ethyl (meth)acrylate, n-propyl (meth)acrylate, isopropyl (meth)acrylate, n-butyl (meth)acrylate, sec-butyl (meth)acrylate, 2-methylheptyl (meth)acrylate, pentyl (meth)acrylate, 2-ethylhexyl (meth) acrylate, 2-ethylbutyl (meth)acrylate, n-octyl (meth)acrylate, isobornyl (meth)acrylate, isooctyl (meth)acrylate, isononyl (meth)acrylate or lauryl (meth)acrylate, and the like, and one or two or more of the foregoing may be appropriately selected and used. Although not particularly limited, as the methacrylic acid ester compound, an alkyl (meth)acrylate having an alkyl group with 1 to 4 carbon atoms and an alkyl (meth)acrylate having an alkyl group with 5 to 8 carbon atoms may be mixed and used.

The acrylic polymer may further comprise a polymerization unit derived from a copolymerizable monomer having a cross-linkable functional group (hereinafter, may be referred to as a cross-linkable monomer). In this specification, the copolymerizable monomer having a cross-linkable functional group may mean, for example, a compound, such as the (meth)acrylic acid ester monomer, having a moiety that can be copolymerized with another monomer included in the polymer, and having a cross-linkable functional group, and thus being capable of imparting the cross-linkable functional group to the polymer. The cross-linkable functional group may be exemplified by a hydroxyl group, a carboxyl group, an isocyanate group, a glycidyl group, an amine group, an alkoxysilyl group or a vinyl group, and the like, and in general, a hydroxyl group or a carboxyl group, and the like may be used.

As the cross-linkable monomer, a copolymerizable monomer having a hydroxyl group may be used. As the copolymerizable monomer having a hydroxyl group, hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth) acrylate, or hydroxyalkylene glycol (meth)acrylate such as 2-hydroxyethylene glycol (meth)acrylate or 2-hydroxypropylene glycol (meth)acrylate, and the like may be used, without being limited thereto. Hydroxyalkyl acrylate or hydroxyalkylene glycol acrylate, and the like may be used among such monomers in consideration of control easiness of the reactivity with other monomers forming blocks, or the glass transition temperature, and the like.

The cross-linkable monomer, for example, may be included in a ratio of 1 to 30 parts by weight, or 1 to 20 parts by weight relative to 100 parts by weight of the pressure-sensitive adhesive resin. In this range, the pressure-sensitive adhesive may realize an appropriate cross-linked structure.

The pressure-sensitive adhesive resin may further comprise, for example, other optional comonomers, if necessary, for control of appropriate physical properties, and the like. The comonomer may include NVP (N-vinylpyrrolidone); an alkylene oxide group-containing monomer such as alkoxy-alkylene glycol (meth)acrylic acid ester, alkoxydialkylene glycol (meth)acrylic acid ester, alkoxytrialkylene glycol (meth)acrylic acid ester, alkoxytetraalkylene glycol (meth) acrylic acid ester, alkoxypolyethylene glycol (meth)acrylic acid ester, phenoxyalkylene glycol (meth)acrylic acid ester, phenoxydialkylene glycol (meth)acrylic acid ester, phe-noxytrialkylene glycol (meth)acrylic acid ester, phenoxytet-raalkylene glycol (meth)acrylic acid ester or phenoxypoly-alkylene glycol (meth)acrylic acid ester; styrene or a styrenic monomer such as methyl styrene; a glycidyl group-containing monomer such as glycidyl (meth)acrylate; or a carboxylic acid vinyl ester such as vinyl acetate, and the like, but is not limited thereto. One or two or more of these comonomers may be selected as an appropriate kind as needed, and included in the polymer. Such a comonomer may be included in the polymer in a ratio of 20 parts by weight or less, or 0.1 parts by weight to 15 parts by weight, relative to the total weight of other compounds used as polymerization units in the polymer.

The pressure-sensitive adhesive resin may have, for example, a weight average molecular weight in a range of 500,000 to 1,500,000. The weight average molecular weight means a converted value of standard polystyrene measured by GPC (Gel Permeation Chromatograph). The weight average molecular weight of the pressure-sensitive adhesive resin may be, specifically, 600,000 or more, 700,000 or more, or 800,000 or more, and may be 1,400,000 or less, 1,300,000 or less, 1,200,000 or less, 1,100,000 or less, or 1,000,000 or less.

The pressure-sensitive adhesive resin may have a viscosity in a range of about 1000 cps to about 2000 cps as measured at a solid content of 28%. The viscosity may be, specifically, 1100 cps or more, 1200 cps or more, 1300 cps or more, 1400 cps or more, 1500 cps or more, or 1600 cps or more, and may be 1900 cps or less, 1800 cps or less, or 1700 cps or less.

The curing agent (cross-linking agent) may be included, for example, in an amount of 0.1 to 0.3 parts by weight relative to 100 parts by weight of the solid content of the pressure-sensitive adhesive resin. The type of curing agent is not particularly limited, which may be selected in consideration of the type of the cross-linkable functional group included in the pressure-sensitive adhesive resin. As the curing agent, a general cross-linking agent such as an isocyanate cross-linking agent, an epoxy cross-linking agent, an aziridine cross-linking agent, and a metal chelate cross-linking agent may be used. According to one example of the present application, the isocyanate cross-linking agent may be used as the curing agent.

The thickness of the first pressure-sensitive adhesive layer may be appropriately selected within a range that does not impair the purpose of the present application. For example, the thickness of the first pressure-sensitive adhesive layer may be in the range of 20 μm to 200 m.

The first pressure-sensitive adhesive layer may have a pressure-sensitive adhesive force of 1,000 gf/in or more at a peel rate of 0.3 mpm (mm/min) to glass. The pressure-sensitive adhesive force may be, specifically, 1,500 gf/in or more or 2,000 gf/in or more. The upper limit of the pressure-sensitive adhesive force may be, for example, 4000 gf/in or less. When the pressure-sensitive adhesive force of the first pressure-sensitive adhesive layer to glass is within the above range, it may be advantageous in terms of durability after laminating the OLED panel.

A method of forming the first pressure-sensitive adhesive layer on the retardation base material layer is not particularly limited. In one example, a pressure-sensitive adhesive composition for forming a first pressure-sensitive adhesive layer may be applied on a known release film (a separate constitution from the release film (30) to be described below), and dried, and then laminated with a retardation base material layer and wound into a roll. The drying may be performed under conditions of a drying temperature zone of 50° C. to 140° C. (the length of the drying oven is about 20 m to 50 m) and a line speed of 5 m/min to 25 m/min. The release film may be peeled off and removed before attaching a release film (30) to be described below to the first pressure-sensitive adhesive layer.

FIG. 2 exemplarily shows a structure of a second back plate film further comprising a protective film (20) and a release film (30) in addition to the retardation base material layer (10a) and the first pressure-sensitive adhesive layer (10b).

As shown in FIG. 2, the back plate film may further comprise a protective film (20) present on the retardation base material layer (10a) side. The protective film may serve to protect the retardation base material layer upon transporting the back plate film or performing processes. When the back plate film is applied to the organic light emitting display, the protective film may be removed.

The protective film (20) may comprise a first base material film (20a) and a second pressure-sensitive adhesive layer (20b) formed on one side of the first base material film (20a). At this time, the protective film may be attached to the retardation base material layer via the second pressure-sensitive adhesive layer.

The thicknesses of the first base material film and the second pressure-sensitive adhesive layer may be appropriately selected within a range that does not impair the purpose of the present application. In one example, the thickness of the first base material film included in the protective film may be in the range of 20 μm to 200 μm. In one example, the thickness of the second pressure-sensitive adhesive layer included in the protective film may be in the range of 10 μm to 200 μm.

In one example, the first base material film may be a PET (polyethylene terephthalate) film. In one example, the second pressure-sensitive adhesive layer may be an acrylic pressure-sensitive adhesive.

The first base material film and the second pressure-sensitive adhesive layer may each independently have anti-static performance. In one example, the back plate film may comprise an antistatic layer formed on one side of the first base material film. In this case, the antistatic layer may be formed on the opposite side of the first base material film on which the second pressure-sensitive adhesive layer is formed. In one example, the back plate film may further comprise an antistatic layer formed on one side of the second pressure-sensitive adhesive layer. In this case, the antistatic layer may be formed on the opposite side of the second pressure-sensitive adhesive layer on which the first base material film is formed. The sheet resistance of the antistatic layer may be in the range of, for example, $10^4$ Ω/square to $10^{11}$ Ω/square. The sheet resistance of the antistatic layer may be specifically, $10^4$ Ω/square or more, $10^5$ Ω/square or more, $10^6$ Ω/square or more, $10^7$ Ω/square or more, or $10^9$ Ω/square or more, and may be $10^{11}$ Ω/square or less, or $10^{10}$ Ω/square or less.

As shown in FIG. 2, the back plate film may further comprise a release film (30) present on the first pressure-sensitive adhesive layer (10b) side.

The release film (30) may comprise a second base material film (30b) and a silicone layer (30a) formed on one side of the second base material film. The release film may serve to protect the first pressure-sensitive adhesive layer. When the back plate film is applied to the organic light emitting display, the release film may be removed.

In the release film (30), the silicone layer (30a) may be disposed closer to the first pressure-sensitive adhesive layer (10b) than the second base material film (30b). The retardation base material layer (10a) and the release film (30) may be attached via the first pressure-sensitive adhesive layer (10b).

In one example, the second base material film may be a PET (polyethylene terephthalate) film.

The second base material film may have antistatic performance. In one example, the back plate film may comprise an antistatic layer formed on one or both sides of the second base material film. In one example, the release film may sequentially comprise a silicone layer, an antistatic layer, a second base material film, and an antistatic layer. The sheet resistance of the antistatic layer may be in the range of, for example, $10^4$ Ω/square to $10^{11}$ Ω/square. The sheet resistance of the antistatic layer may be, specifically, $10^4$ Ω/square or more, $10^5$ Ω/square or more, $10^6$ Ω/square or more, $10^7$ Ω/square or more, or $10^9$ Ω/square or more, and may be $10^{11}$ Ω/square or less, or $10^{10}$ Ω/square or less.

The thickness of the second base material film may be appropriately selected within a range that does not impair the purpose of the present application. In one example, the thickness of the second base material film may be in the range of 20 μm to 200 μm.

A composition for forming a silicone layer may be coated on the second base material film, and then dried to form a silicone layer. The coating thickness of the composition for forming a silicone layer may be, for example, within a range of 10 nm to 2000 nm.

In the back plate film, the peel force and linear resistance between the respective layers may be appropriately selected within a range that does not impair the purpose of the present application.

In one example, the peel force as measured while the protective film (20) is attached to the retardation base material layer (10a), and then peeled off may be within a range of 1 gf/in to 9 gf/in. In one example, the peel force as measured while the first pressure-sensitive adhesive layer (10b) of the first back plate film (10) is attached to glass, and then peeled off may be in the range of 1,100 gf/in to 3,000 gf/in. In one example, the peel force as measured while the release film (30) is attached to the first pressure-sensitive adhesive layer (10b) of the first back plate film (10), and then peeled off may be in the range of 1 gf/in to 7 gf/in.

In one example, the linear resistance as measured with respect to the base material film (20a) side of the protective film (20) may be in the range of $10^4$ Ω to $10^9$ Ω, $10^5$ Ω to $10^9$ Ω, $10^6$ Ω to $10^9$ Ω, or $10^7$ Ω to $10^9$ Ω. In one example, the linear resistance as measured with respect to the retardation base material layer (10a) side of the first back plate film (10) may be in the range of $10^4$ Ω to $10^9$ Ω, $10^5$ Ω to $10^9$ Ω, $10^6$ Ω to $10^9$ Ω, $10^7$ Ω to $10^9$ Ω, or $10^8$ Ω to $10^9$ Ω. In one example, the linear resistance as measured with respect to the first pressure-sensitive adhesive layer (10b) side of the first back plate film (10) may be in the range of $10^{11}$Ω to $10^{16}$ Ω, $10^{11}$Ω to $10^{15}$ Ω, $10^{11}$Ω to $10^{14}$Ω, or $10^{13}$Ω to $10^{14}$Ω. In one example, the linear resistance as measured with respect to the silicone layer (30a) side of the release film (30) may be in the range of $10^4$ Ω to $10^9$ Ω, $10^5$ Ω to $10^9$ Ω, or $10^6$ Ω to $10^8$ Ω. In one example, the linear resistance as measured with respect to the second base material film (30b) side of the release film (30) may be in the range of $10^4$ Ω to $10^9$ Ω, $10^4$ Ω to $10^8$ Ω, or $10^5$ Ω to $10^7$ Ω.

The present application also relates to a use of the back plate film.

In one example, the present application relates to an organic light emitting display comprising the back plate film and an OLED (organic light emitting diode) panel. The above-described contents may be equally applied to the contents related to the back plate. The back plate film may be applied to the OLED panel in a state where the protective film and the release film are removed, for example, in a state including only the retardation base material layer and the first pressure-sensitive adhesive layer.

The OLED panel may be a flexible OLED panel comprising a plastic (polymer) substrate. The backplate film may be attached to the polymer substrate of the OLED panel via the first pressure-sensitive adhesive layer. In the production line of the flexible OLED panel, the OLED panel, in which a polymer substrate, for example, a PI substrate is made on a carrier glass, and processes such as organic material deposition and encapsulation are completed, may undergo a laser lift-off (LLO) process. Since the polymer substrate from which the carrier glass is removed through LLO is thin, there may be a problem of being rolled up if left as it is. The back plate film may play a role of holding the polymer substrate so that it does not curl. After attaching the back plate film to the polymer substrate, a process of attaching a touch sensor, a polarizing plate, and the like may be continued.

In one example, the present application relates to a mobile phone comprising the back plate film. That is, the organic light emitting display may be a mobile phone. FIG. 3 illustratively shows the mobile phone. The mobile phone may sequentially comprise a cover window (100), a polarizing plate (200), a touch sensor (300), an OLED panel (400), a back plate film (500), and a camera (600). The above-described contents may be equally applied to the contents related to the back plate. The back plate film may be applied to a mobile phone in a state where the protective film and the release film are removed, for example, in a state where only the retardation base material layer and the first pressure-sensitive adhesive layer are included. The first pressure-sensitive adhesive layer of the back plate film may be in contact with the OLED panel. That is, the back plate film may be attached to the OLED panel via the first pressure-sensitive adhesive layer.

In one example, the mobile phone may further comprise a metal layer formed on one side of the retardation base material layer of the back plate film. The metal layer may be attached to the retardation base material layer via an adhesive layer. The metal layer may perform a heat dissipation function of diffusing heat generated from the display.

The camera may be a front camera of the OLED panel. A front camera region may not be punched on the OLED panel. Therefore, the display may also be implemented in the front camera region of the mobile phone.

In the cover window, polarizing plate, touch sensor, OLED (organic light emitting diode) panel, and camera, those known in the art may be appropriately selected and used within a range that does not impair the purpose of the present application.

Effects of Invention

The present application provides a back plate film for an under-display camera in which a front camera of a mobile phone can capture a subject without image distortion.

BRIEF DESCRIPTION OF DRAWINGS

FIG. 1 exemplarily shows a back plate film of the present application.

FIG. 2 exemplarily shows a back plate film of the present application.

FIG. 3 exemplarily shows a structure of a mobile phone of the present application.

FIG. 4 is pictures taken to evaluate the occurrence of image distortion.

FIG. 5 is pictures taken to evaluate the occurrence of image distortion.

EXAMPLES

Hereinafter, the present application will be specifically described through examples according to the present application and comparative examples not according to the present application, but the scope of the present application is not limited by the examples presented below.

Measurement Example 1. Pressure-Sensitive Adhesive Force Measurement

The pressure-sensitive adhesive force of the pressure-sensitive adhesive layer was measured using a texture analyzer (Stable Micro Systems) at an angle of 180° and a peel rate of 300 mm/min, and measured after the pressure-sensitive adhesive layer formed on the release film was cut to a size of width×length=1 inch×6 inches, and then reciprocated once with a 2 kg rubber roller to be attached to a glass substrate.

Measurement Example 2. Release Force Measurement

The release force of the pressure-sensitive adhesive layer was measured using a texture analyzer (Stable Micro Systems) at an angle of 180° and a peel rate of 300 mm/min, and measured after the pressure-sensitive adhesive layer formed on the release film was cut to a size of width×length=1 inch×6 inches, and then attached to a double-sided tape.

Measurement Example 3. Optical Property Measurement

A sample with a size of width×length=3 cm×3 cm was prepared, and then using a Hazemeter (Nippon Denshoku COH 400) equipment, the haze and transmittance of the base material layer for D65 light source in a state where the pressure-sensitive adhesive layer was attached after peeling the release film were measured.

Measurement Example 4. Retardation Measurement

A sample with a size of width×length=3 cm×3 cm was prepared, and then using AXO-SCAN (AXO-METRICS)

equipment, the in-plane retardation (R0) value and thickness direction retardation (Rth) value of the base material layer for light with a wavelength of 550 nm were measured after peeling the release film.

Example 1

As a retardation base material layer, an SRF (super retardation film) base material layer (TA-044, Toyobo) with a thickness of 80 μm was prepared. The haze of the SRF base material layer was 0.89%, and the transmittance was 93.13%. In addition, the SRF base material layer had an in-plane retardation (R0) of 7,418 nm and a thickness direction retardation (Rth) of −8,110 nm. An antistatic agent was coated on one side of the SRF base material with Mayer Bar #3, and then dried in a Matiz oven at 100° C. for 100 seconds to form an antistatic layer, where the antistatic layer had a sheet resistance of $10^9$ Ω/square. The sheet resistance was measured using a resistance meter (Nittoseiko Analytech, MCP-HT800).

100 parts by weight (solid content) of a pressure-sensitive adhesive resin (SYS-3355, Samyoung), 0.25 parts by weight of a curing agent (DR-7030HD, Samyoung), 3 parts by weight of a retardant (acetylacetone), and a toluene solvent were mixed to prepare a primary formulation liquid with a solid content of 19%. A pressure-sensitive adhesive resin (SYS-3355, Samyoung Co.) and toluene were mixed to adjust the solid content to 21%, thereby preparing a secondary formulation liquid. The pressure-sensitive adhesive resin (SYS-3355, Samyoung) comprises 75 parts by weight of 2-EHA (2-ethylhexyl acrylate), 10 parts by weight of MMA (methyl methacrylate), 5 parts by weight of NVP (N-vinylpyrrolidone), and 10 parts by weight of 2-HEA (2-hydroxyethyl acrylate) as polymerization units. The curing agent (DR-7030HD, Samyoung) comprises 30 parts by weight of H12MDI (1-isocyanato-4-[(4-isocyanatocyclohexyl)methyl]cyclohexane) and 70 parts by wight of IPDI (5-isocyanato-1-(isocyanatomehtyl)-1,3,3-trimethylcyclohexane). The weight average molecular weight of the pressure-sensitive adhesive resin was 890,000, and the viscosity of 28% solid content at a temperature of 25° C. was 1650 cp.

A pressure-sensitive adhesive composition was prepared by mixing the first formulation liquid and the second formulation liquid. The pressure-sensitive adhesive composition was applied to a release layer (Si layer) of a release film using a slit die and a nip die, and then dried in an oven composed of 6 sections (one section 5m), in which the temperatures were set to 60° C., 90° C., 110° C., 120° C., 120° C., and 120° C., at a speed of 15 m/min to prepare a first pressure-sensitive adhesive layer with a thickness of 15 m. The dried first pressure-sensitive adhesive layer and the retardation base material layer were laminated and then wound into a roll shape, thereby producing a first back plate film. The first pressure-sensitive adhesive layer had a pressure-sensitive adhesive force of 2039 gf/in as measured in Measurement Example 1 and a release force of 4.5 gf/in as measured in Measurement Example 2.

An antistatic layer was formed by coating an antistatic agent on one side of a PET film (first base material film) with a thickness of 75 μm using microgravure, where the sheet resistance of the antistatic layer was $10^9$ Ω/square. An acrylic pressure-sensitive adhesive (second pressure-sensitive adhesive layer) with a thickness of 15 μm was coated on the opposite side of the PET film, followed by oven coating. The surface of the acrylic pressure-sensitive adhesive was laminated with the release layer (Si layer) of the release film and wound, and then aged for 2 days to produce a protective film (20).

As the release film (30), SKC HTM's RF02ASW product was prepared. The release film comprises a PET film (second base material film) and a silicone layer formed on one side of the PET film.

The retardation base material layer and the release film were attached via the first pressure-sensitive adhesive layer formed on the retardation base material layer. At this time, they were attached so that the silicone layer of the release film was in contact with the first pressure-sensitive adhesive layer. A back plate film having the structure of FIG. 2 was produced by attaching the protective film to the retardation base material layer through the second pressure-sensitive adhesive layer of the protective film.

The physical properties of the back plate film are shown in Table 1 below. In the peel force, PF is a value measured while the protective film (20) is attached to the retardation base material layer (10a), and then peeled; Adhesion is a value measured while the first pressure-sensitive adhesive layer (10b) of the first back plate film (10) is attached to glass, and then peeled; and LF is a value measured while the release film (30) is attached to the first pressure-sensitive adhesive layer (10b) of the first back plate film (10), and then peeled. The peel force is a value measured using a texture analyzer (Stable Micro Systems) at an angle of 180° and a peel rate of 0.3 mpm. In the linear resistance, the PF side is a value measured with respect to the base material film (20a) side of the protective film (20); the Film side is a value measured with respect to the retardation base material layer (10a) side of the first back plate film (10); the PSA side is a value measured with respect to the first pressure-sensitive adhesive layer (10b) side of the first back plate film (10); the LF (Si) side is a value measured with respect to the silicone layer (30a) side of the release film (30); and the LF Side is a value measured with respect to the second base material film (30b) side of the release film (30). The linear resistance was measured using a resistance meter (Nittoseiko Analytech, MCP-HT800).

TABLE 1

| Peel Force (gf/in) | PF | 1.28 |
|---|---|---|
| | Adhesion | 2246 |
| | LF | 3.1 |
| Linear Resistance (Ω) | PF side | $10^8$ (1.00E+08) |
| | Film Side | $10^9$ (1.00E+09) |
| | PSA side | $10^{14}$ (1.0E+14) |
| | LF (Si) side | $10^7$ (1.00E+07) |
| | LF side | $10^6$ (1.00E+06) |

Comparative Example 1

A back plate film was manufactured in the same manner as in Example 1, except that the retardation base material layer and the first pressure-sensitive adhesive layer were changed as follows.

A PET base material (T914J75, Mitsubishi) with a thickness of 50 μm was prepared as the retardation base material layer. The haze of the PET base material is 1.5% and the transmittance is 90.3%. In addition, the PET base material has an in-plane retardation (R0) of 2,509 nm and a thickness direction retardation (Rth) of −3,297 nm. An antistatic agent was coated on one side of the PET base material with Mayer Bar #3, and then dried in a Matiz oven at 100° C. for 100 seconds to form an antistatic layer, where the sheet resistance of the antistatic layer was $10^9$ Ω/square.

The first pressure-sensitive adhesive layer was formed in the same manner as in Example 1, except that the thickness of the first pressure-sensitive adhesive layer was changed to 10 m. The first pressure-sensitive adhesive layer had a pressure-sensitive adhesive force of 1909 gf/in as measured in Measurement Example 1 and a release force of 1.2 gf/in as measured in Measurement Example 2.

Evaluation Example 1. Evaluation of Image Distortion Occurrence

The protective film and the release film were peeled from each of the back plate films of Example 1 and Comparative Example 1. A sample in which the back plate film including the retardation base material layer and the first pressure-sensitive adhesive layer was attached to a polarizer was disposed in the front of a camera, and then an image was taken to evaluate whether the front camera could capture a subject without image distortion. The polarizer is an absorption-type linear polarizer, which is an iodine-dyed PVA (polyvinyl alcohol)-based polarizer. FIGS. 4 and 5 each show a taken photograph. In the case of applying the back plate film of Example 1 (A), the front camera could capture the subject without image distortion, but in the case of applying the back plate film (B) of Comparative Example 1, subject distortion was found.

EXPLANATION OF REFERENCE NUMERALS

10: first back plate film; 10a: retardation base material layer, 10b: first pressure-sensitive adhesive layer, 20: protective film, 20a: first base material film, 20b: second pressure-sensitive adhesive layer, 30: release film, 30a: silicone layer, 30b: second base material film, 100: cover window, 200: polarizing plate, 300: touch sensor, 400: OLED panel, 500: back plate film, 600: camera

The invention claimed is:

1. A back plate film comprising: a retardation base material layer; and a first pressure-sensitive adhesive layer formed on one side of the retardation base material layer, wherein an absolute value of an in-plane retardation (R0) value calculated by Equation 1 below of the retardation base material layer is 6,000 nm or more, and an absolute value of a thickness direction retardation (Rth) value calculated by Equation 2 below is 6,000 nm or more:

$$R0 = (nx - ny) \times d \qquad \text{[Equation 1]}$$

$$Rth = \left[(nx + ny)/2 - nz\right] \times d \qquad \text{[Equation 2]}$$

wherein, nx, ny, and nz are refractive indices of the retardation base material layer in the x-axis direction, y-axis direction, and z-axis direction for light with a wavelength of 550 nm, respectively, and d is a thickness (nm) of the retardation base material layer; wherein the retardation base material layer is configured to compensate phase distortion of light transmitted through the display panel toward an imaging sensor by controlling phase retardation in an optical path; wherein the absolute value of the in-plane retardation (R0) value of the retardation base material layer is 10,000 nm or less;

wherein the absolute value of the thickness direction retardation (Rth) value of the retardation base material layer is 10,000 nm or less;

wherein the thickness-direction retardation Rth is negative.

2. The back plate film according to claim 1, wherein the retardation base material layer has a thickness in a range of 20 μm to 200 μm.

3. The back plate film according to claim 1, comprising an antistatic layer formed on a side of the retardation base material layer on which the first pressure-sensitive adhesive layer is not formed, wherein the antistatic layer has a sheet resistance in a range of 104 Q/square to 1011 Q/square.

4. The back plate film according to claim 1, wherein the first pressure-sensitive adhesive layer comprises an acrylic resin and a curing agent, and has a thickness in a range of 20 μm to 200 μm.

5. The back plate film according to claim 1, wherein the first pressure-sensitive adhesive layer has a pressure-sensitive adhesive force to glass at a peel rate of 0.3 mpm in a range of 1000 gf/in to 4000 gf/in.

6. The back plate film according to claim 1, further comprising a protective film present on a side of the retardation base material layer.

7. The back plate film according to claim 6, wherein the protective film comprises a first base material film and a second pressure-sensitive adhesive layer formed on one side of the first base material film, the first base material film has a thickness in a range of 20 μm to 200 μm, and the second pressure-sensitive adhesive layer has a thickness in a range of 10 μm to 200 μm.

8. The back plate film according to claim 7, wherein the first base material film is a PET (polyethylene terephthalate) film.

9. The back plate film according to claim 7, further comprising an antistatic layer formed on one side of at least one of the first base material film and the second pressure-sensitive adhesive layer, wherein the antistatic layer has a sheet resistance of 104 Q/square to 1011 Q/square.

10. The back plate film according to claim 6, further comprising a release film present on a side of the first pressure-sensitive adhesive layer.

11. The back plate film according to claim 10, wherein the release film comprises a second base material film and a silicone layer formed on one side of the second base material film.

12. The back plate film according to claim 11, wherein the second base material film is a PET (polyethylene terephthalate) film.

13. The back plate film according to claim 11, comprising an antistatic layer formed on one or both sides of the second base material film, wherein the antistatic layer has a sheet resistance in a range of 104 Q/square to 1011 Q/square.

14. An organic light emitting display comprising the back plate film of claim 1 and an OLED (organic light emitting diode) panel.

15. The organic light emitting display according to claim 14, wherein the first pressure-sensitive adhesive layer of the back plate film is in contact with the OLED panel.

16. A mobile phone sequentially comprising a cover window, a polarizing plate, a touch sensor, an OLED (organic light emitting diode) panel, the back plate film of claim 1, and a camera.

17. The mobile phone according to claim 16, wherein no front camera region is punched on the OLED panel.

* * * * *